US012320928B2

United States Patent
Seliuchenko et al.

(10) Patent No.: US 12,320,928 B2
(45) Date of Patent: Jun. 3, 2025

(54) PHASE ANGLE CORRECTION VALUE CALCULATION APPARATUS AND METHOD OF CALCULATING A PHASE ANGLE CORRECTION VALUE

(71) Applicant: Melexis Technologies NV, Tessenderlo (BE)

(72) Inventors: Volodymyr Seliuchenko, Nashua, NH (US); Andreas Ott, Erfurt (DE); Kyle Legg, Nashua, NH (US)

(73) Assignee: Melexis Technologies NV, Tessenderlo (BE)

( * ) Notice: Subject to any disclaimer, the term of this patent is extended or adjusted under 35 U.S.C. 154(b) by 915 days.

(21) Appl. No.: 17/117,303

(22) Filed: Dec. 10, 2020

(65) Prior Publication Data

US 2021/0173088 A1    Jun. 10, 2021

(30) Foreign Application Priority Data

Dec. 10, 2019  (EP) .................................... 19214952

(51) Int. Cl.
*G01S 17/894*    (2020.01)
*G01B 11/26*    (2006.01)
(Continued)

(52) U.S. Cl.
CPC ............ *G01S 7/4865* (2013.01); *G01B 11/26* (2013.01); *G01S 7/4808* (2013.01); *G01S 7/497* (2013.01);
(Continued)

(58) Field of Classification Search
CPC ...... G01S 7/4865; G01S 7/4808; G01S 7/497; G01S 17/36; G01S 17/89; G01S 17/46;
(Continued)

(56) References Cited

U.S. PATENT DOCUMENTS 4,289,397 A * 9/1981 Itzkan ..................... G01S 17/95
333/19
4,968,968 A    11/1990 Taylor
(Continued)

FOREIGN PATENT DOCUMENTS

DE    102016106511 A1 * 10/2016 ............. G01S 17/36
DE    102018107801 A1   10/2018
EP       3961258 A1    3/2022

OTHER PUBLICATIONS

Translation of description of DE102016106511, 64 pages, translation created Dec. 11, 2023 (Year: 2023).*
(Continued)

*Primary Examiner* — Daniel L Murphy
(74) *Attorney, Agent, or Firm* — Harness, Dickey & Pierce, P.L.C (57) ABSTRACT

A phase angle error calculation apparatus (100) comprising a light source (102) that emits light according to an indirect time of flight (iToF) measurement technique. A photonic mixer cell (104) generates and stores a plurality of electrical output signals corresponding to a plurality of predetermined phase offset values. A signal processing circuit processes the electrical output signals according to the iToF measurement technique in order to calculate a reference vector and a reference phase angle therefrom. The output signals correspond to measurement at a first level of precision. The circuit processes a subset of output signals according to the iToF measurement technique and calculates a measurement vector and a measurement phase angle therefrom. The subset of the output signals corresponds to measurement at a second level of precision lower than the first level of precision. The circuit calculates a phase angle correction value using the reference phase angle and the measurement phase angle.

20 Claims, 8 Drawing Sheets

(51) Int. Cl.

| | |
|---|---|
| *G01S 7/48* | (2006.01) |
| *G01S 7/4865* | (2020.01) |
| *G01S 7/497* | (2006.01) |
| *G01S 17/36* | (2006.01) |
| *G01S 17/46* | (2006.01) |
| *G01S 17/89* | (2020.01) |

(52) U.S. Cl.
CPC .............. *G01S 17/36* (2013.01); *G01S 17/46* (2013.01); *G01S 17/89* (2013.01); *G01S 17/894* (2020.01)

(58) Field of Classification Search
CPC ........ G01S 17/894; G01S 17/08; G01S 7/481; G01B 11/26
USPC .......................................................... 356/5.1
See application file for complete search history.

(56) References Cited

U.S. PATENT DOCUMENTS

| | | | |
|---|---|---|---|
| 7,809,182 B2 | 10/2010 | Kirschner | |
| 7,936,449 B1 | 5/2011 | Bamji et al. | |
| 8,611,610 B2* | 12/2013 | Park ........................ | G06T 7/521 250/214 R |
| 2017/0041589 A1* | 2/2017 | Patil ....................... | G01S 17/894 |
| 2019/0078996 A1 | 3/2019 | Mehrle et al. | |
| 2020/0371205 A1* | 11/2020 | Loesch ................. | G01S 7/4017 |

OTHER PUBLICATIONS

Translation of claims of DE102016106511, created Dec. 11, 2023, 10 pages (Year: 2023).*

Feigin et al., Modeling "Wiggling" as A Multi-Path Interference Problem In AMCW ToF Imaging, Jul. 27, 2015, vol. 23, No. 15, DOI:10.1364/OE.23.019213, Optics Express 19213.

Lindner et al., "Time-of-Flight Sensor Calibration For Accurate Range Sensing", Computer Vision and Image Understanding, 114 (2010), 1318-1328.

Payne et al., "Improved Linearity Using Harmonic Error Rejection In A Full-Field Range Imaging System", SPIE-IS&T, vol. 6805, 68050D-1, Jan. 31, 2008.

European Search Report for European Application No. 19214952 dated Jun. 5, 2020.

U.S. Office Action for corresponding U.S. Appl. No. 17/109,356 mailed Apr. 4, 2024.

Southwell, W. H., "Wave-front estimation from wave-front slope measurements", Journal of the Optical Society of America (1917-1983) vol. 7, No. 8, p. 998, 1980. (Year: 1980).

Payne et al., Improved linearity using harmonic error rejection in a full-field range imaging system, Journal: Three-Dimensional Image Capture and Applications 2008, : 2008, ISSN: 0277-786X (Year: 2008).

U.S. Office Action for corresponding U.S. Appl. No. 17/109,356 mailed Aug. 7, 2024.

U.S Notice of Allowance issued on Dec. 19, 2024 for co-pending U.S. Appl. No. 17/109,356.

* cited by examiner

PHASE ANGLE CORRECTION VALUE CALCULATION APPARATUS AND METHOD OF CALCULATING A PHASE ANGLE CORRECTION VALUE

FIELD

The present invention relates to a phase angle correction value calculation apparatus of the type that, for example, is configured to emit light and process received reflected light in accordance with an indirect time of flight measurement technique. The present invention also relates to a method of calculating a phase angle correction value, the method being of the type that, for example, employs an indirect time of flight measurement technique.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by, for example, 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m. Also, a conventional iToF system is susceptible to errors due to multiple reflections and multiple propagation paths.

As explained above, iToF systems sample in respect of different applied phases. A typical iToF system comprises a buffer that stores analogue signals generated by a so-called photonic mixer device in respect of m phases employed for subsequent signal processing. A discrete Fourier transformation unit calculates a fundamental frequency of a complex signal stored by the buffer in terms of in-phase and quadrature components of the signals. Using the values of the in-phase and quadrature components, a phase angle of the complex signal and the amplitude can be calculated and the distance to an object can be solved using the phase angle information.

However, such amplitude modulated continuous wave type systems suffer from an inherent depth measurement error due to aliasing of the emitted light signal versus a reference signal correlation function. This is due to higher harmonics present in both the emitted light signal and the reference signal, which are not accounted for in modelling or measurement. This kind of error is known as wiggling or circular errors (see "Modeling "wiggling" as a multi-path interference problem in AMCW ToF imaging", Feigin et al., OSA Optics Express, 2015).

In order to obviate or at least mitigate for the errors, it is known to take a phenomenological approach to compensation for circular errors. In this regard, B-spline or lookup table-based correction methods are known, for example as described in "Time-of-Flight sensor calibration for accurate range sensing" (Lindner et al., Computer Vision and Image Understanding, 114 (2010), pages 1318-1328), for compensating an aggregation of error phenomena. However, such a technique is sensitive to changes in system properties, for example temperature and frequency used to modulate an optical illumination signal emitted by an optical source and demodulate an optical signal received by the photonic mixer device.

For some implementations, the application of a high number of phases reduces the circular error of a given phase angle measurement to a negligible levels, especially when the number of phase offset values employed is odd. However, a significant drawback of this approach is that amount of time required for the photonic mixer device to generate a large number of electrical output signals. In this regard, the more time that is taken, the greater the chance that the phase angle measurement will be influenced by so-called motion artefacts as a result of the scene being dynamic. Therefore, from a practical standpoint it is advantageous to employ a smaller number of phase offsets values when measuring the phase angle (than the relatively high number of phase offset values required to minimise the circular errors) and to compensate for the circular errors using a model predicting circular error magnitude as suggested above.

Typically, a common method to reduce circular errors is deployed on a one-time basis during a calibration stage at the end of the manufacturing process for the iToF system. During calibration, an object is placed in front of an iToF camera and the object is regularly relocated from a minimum to the maximum measurable distance to the iToF camera in several steps. At each relocation step, a distance to the object is measured using the relatively low number of phases employed during normal operation of the iToF system, for example four phase offset values, the measured distance being recorded together with the known ideal distance to the object. After making measurements in respect of each relocation step, a curve is constructed and the circular error can be estimated for each phase angle measurement. The estimated circular error can then be recorded in a look-up table and used for circular error compensation in real-time operation of the iToF system. However, such a calibration technique is time consuming since it requires physical object relocation.

U.S. Pat. No. 7,936,449 describes an improved calibration procedure for circular error compensation where the object is statically positioned at a known distance during calibration and instead of relocating the object to multiple different distances to the iToF camera, measurement is performed for a set of known phase delays that are introduced to each distance measurement. This approach reduces the time needed for calibration, but requires a highly accurate delay line providing known phase delays, which can increase the cost of the production of a silicon die of the iToF system and/or the cost and time of calibration. Also, since this calibration is also only performed once at the end of the production cycle, corrections are not made in respect to drift of the circular error occurring over time in the iToF system due to aging or temperature changes.

SUMMARY

According to a first aspect of the present invention, there is provided a phase angle error calculation apparatus for an optical ranging system, the apparatus comprising: a light source configured to emit light in accordance with an indirect time of flight measurement technique; a photonic mixer cell configured to generate and store a plurality of electrical output signals respectively corresponding to a plurality of predetermined phase offset values applied in accordance with the indirect time of flight measurement technique over a measurement cycle; a signal processing circuit configured to process the plurality of electrical output signals in accordance with the indirect time of flight measurement technique in order to calculate a reference vector and a reference phase angle from the reference vector, the plurality of electrical output signals corresponding to measurement at a first level of precision; wherein the signal processing circuit is configured to process a subset of electrical output signals from the plurality of electrical output signals in accordance with the indirect time of flight measurement technique in order to calculate a measurement vector and a measurement phase angle from the measurement vector, the subset of the electrical output signals corresponding to measurement at a second level of precision lower than the first level of precision; and the signal processing circuit is configured to calculate a phase angle correction value using the reference phase angle and the measurement phase angle.

The apparatus may further comprise: a time-of-flight modification unit configured to introduce a phase delay into the light that is emitted and reflected back to the photonic mixer cell; wherein the signal processing circuit may be configured to perform a repeat calculation of the phase angle correction value over a plurality of measurement cycles subsequent to the measurement cycle in order to calculate a plurality of phase angle correction values.

The phase delay may be unknown.

The time-of-flight modification unit may be a delay network providing a plurality of different time delays and may be configured to delay the phase of the light emitted by the light source by differing amounts between the plurality of measurement cycles.

The photonic mixer cell may comprise a photodetector element. A substantially static object may be located in front of the photodetector element. The substantially static object may provide a substantially single distance to the photodetector element.

The delay network may comprise an analogue delay line.

Application of the plurality of different time delays of the delay network may provide a range of phase measurements comprising respective phase errors; the range of phase measurements may be at least within a circular error period.

The apparatus may further comprise: a plurality of photonic mixer cells comprising the photonic mixer cell, the plurality of photonic mixer cells comprising a plurality of photodetector elements, respectively; a time-of-flight modification unit configured to introduce a plurality of respective phase delays into the light reflected back to the plurality of photodetector elements; wherein the signal processing circuit may be configured to perform the calculation of the phase angle correction value over the measurement cycle and in respect of the plurality of photonic mixer cells in order to calculate a plurality of phase angle correction values.

The time-of-flight modification unit may be an object located in a scene and arranged relative to the plurality of photodetector elements so as to extend away from the plurality of photodetector elements sufficiently to enable a range of phase angle correction values to be calculated in respect of and at least within a circular error period.

The signal processing circuitry may be configured to support an error modelling unit configured to analyse the plurality of phase angle correction values and to generate a model of the plurality of phase angle correction values.

The error modelling unit may be configured to generate a lookup table comprising phase error correction values over a predetermined range of calculated phase angles in respect of measurements at the second level of precision.

The phase error correction values may correspond to a plurality of uncorrected measurement phase angles; a range of the plurality of uncorrected measurement phase angles may comprise the circular error period. The plurality of uncorrected measurement phase angles may comprise a phase angle interval therebetween; the phase angle interval may be consistent.

The plurality of electrical output signals in respect of the measurement at the first level of precision may comprise a first set of electrical output signals in respect of the measurement at the second level of precision and a second set of electrical output signals in respect of the measurement at the second level of precision.

The plurality of predetermined phase offset values may comprise a first set of predetermined phase offset values and a second set of predetermined phase offset values; and the first set of electrical output signals in respect of the measurement at the second level of precision may correspond to the first set of predetermined phase offset values and the second set of electrical output signals in respect of the measurement at the second level of precision may correspond to the second set of predetermined phase offset values.

The second set of phase offset values may be different to the first set of phase offset values. The first set of phase offset values may comprise a number of phase offset values in common with the second set of phase offset values. The first set of phase offset values may be the same as the second set of phase offset values.

The signal processing circuitry may be configured to support a motion detection unit configured to detect motion during generation of the plurality of electrical output signals and to omit calculation of the phase angle correction value in response to detection of motion.

The motion detection unit may be configured to detect the motion by comparing a first electrical output signal in respect of a first predetermined phase offset value of the plurality of the predetermined phase offset values and a second electrical output signal in respect of a second subsequent predetermined phase offset value of the plurality of the predetermined phase offset values; the second subsequent predetermined phase offset value may follow application of a number of the plurality of predetermined phase offset values and the second phase offset value may be substantially the same as the first phase offset value.

The signal processing circuit may be configured to detect motion by calculating the difference between the first electrical output signal and the second electrical output signal.

According to a second aspect of the present invention, there is provided an optical ranging system comprising the phase angle error calculation apparatus as set forth above in relation to the first aspect of the invention, the system further comprising: the signal processing circuit configured to apply the calculated phase angle correction value to the measurement phase angle in order to correct the measured phase angle; and the signal processing circuit is configured to calculate a range using the corrected measured phase angle.

According to a third aspect of the present invention, there is provided a method of calculating a phase angle correction value, the method comprising: a light source emitting light in accordance with an indirect time of flight measurement technique; a photonic mixer cell generating and storing a plurality of electrical output signals respectively corresponding to a plurality of predetermined phase offset values applied in accordance with the indirect time of flight measurement technique over a measurement cycle; a signal processing circuit processing the plurality of electrical output signals in accordance with the indirect time of flight measurement technique in order to calculate a reference vector and a reference phase angle from the reference vector, the plurality of electrical output signals corresponding to measurement at a first level of precision; wherein the signal processing circuit processes a subset of electrical output signals from the plurality of electrical output signals in accordance with the indirect time of flight measurement technique in order to calculate a measurement vector and a measurement phase angle from the measurement vector, the subset of the electrical output signals being a smaller set than the plurality of electrical output signals and corresponding to measurement at a second level of precision lower than the first level of precision; and the signal processing circuit calculates the phase angle correction value using the reference phase angle and the measurement phase angle.

According to a fourth aspect of the present invention, there is provided a method of reducing errors in an indirect time of flight measurement system, the method comprising: illuminating a scene; repeatedly calculating a first phase angle to a first precision and a second phase angle to a second precision using electrical output signals in respect of a single measurement cycle in accordance with an indirect time of flight measurement technique, the calculation of the first phase angle employing a plurality of phase offset values and the calculation of the second phase angle employing a subset of the plurality of phase offset values; delaying propagation of light reflected by the scene; calculating a plurality of phase errors using the first and second phase angles calculated; generating a model of the plurality of phase errors; using the model of the plurality of phase errors to correct a subsequent phase angle measurement.

It is thus possible to provide an apparatus and method that are each capable of calculating circular errors, or so called wiggling, without any knowledge of distances to objects in a calibration scene. Reliance upon a priori distance data can be avoided owing to the use of a set of electrical output signals in respect of a measurement cycle as a reservoir of measurements that can be used to calculate phase angles at two different levels of precision and compared. Furthermore, obviating the need to rely on a priori distance data enables an arbitrary scene to be used for calibration. This also serves to improve the accuracy of calculation of phase error values, which hitherto has relied upon mechanical movement of reference objects in a scene as part of the calibration process. Additionally, the apparatus and method provide greater flexibility as to timing of performance of the calibration, as calibration can be performed in the field without the need for any special or dedicated calibration objection or arrangement. The apparatus and method also provide a degree of immunity to thermal changes (drift) and ageing of components in the apparatus.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Throughout the following description, identical reference numerals will be used to identify like parts.

Figure 1:
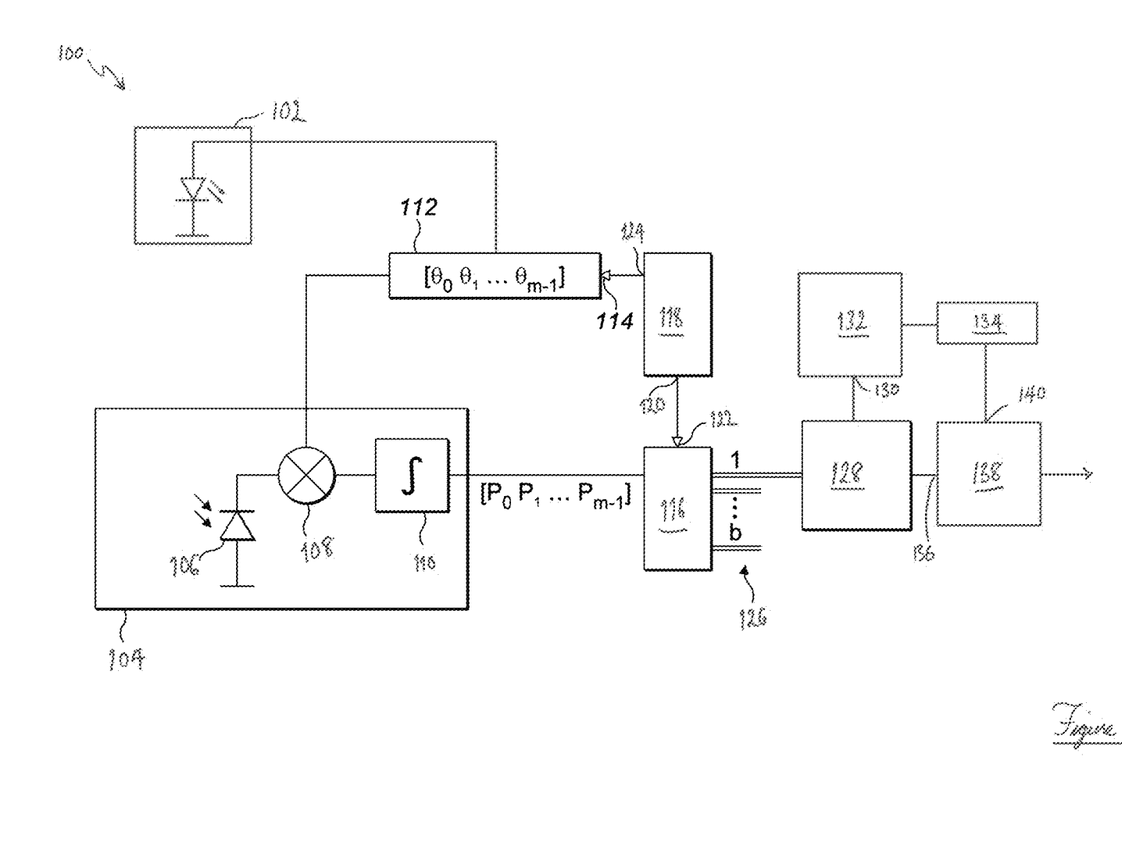
FIG. 1 is a schematic diagram of a phase angle error calculation apparatus constituting an embodiment of the invention.

Referring to FIG. 1, a first phase angle error calculation apparatus 100 comprises a source of electromagnetic radiation 102, for example a Laser Diode (LD) or a Light Emitting Diode (LED). In this example, the source of electromagnetic radiation is infrared light that is amplitude modulated in accordance with an indirect time of flight measurement technique so as to be emitted as a continuous wave optical signal. A detection and ranging module of the apparatus 100 comprises an optical receiver photonic mixer pixel device 104, the optical receiver photonic mixer pixel device 104 comprising a photodetector element, for example a photodiode 106, having an anode operably coupled to a modulated voltage source and a cathode coupled a first input of a photonic mixer 108, an output of the photonic mixer 108 being coupled to an input of an integrator 110. Although a single photonic mixer pixel device 104 is being described for the sake of conciseness and clarity of description, the skilled person will appreciate that the detection and ranging module comprises an array of photonic mixer pixel devices of the kind described above.

A phase signal generator 112 is configured to generate a continuous wave electrical signal. The phase offset of the continuous wave signal is selectable via a control input 114, the phase of the continuous wave signal being selectable from a set of phase offsets: $[\theta_0, \theta_1, \ldots, \theta_{m-1}]$. A first output of the phase signal generator 112 is coupled to a second input of photonic mixer 108 and a second output of the phase signal generator 112 is operably coupled to the source of electromagnetic radiation 102.

An output of the integrator 110 is coupled to an input of a Digital Fourier Transform (DFT) unit 116. In this respect, phase angle measurements are transferred serially to the DFT unit 116, thereby reducing memory requirements for the detection and ranging module. The DFT unit 116 comprises internal buffers (not shown) to support serial transfer of measurements from the integrator 110. In order to support this arrangement, the DFT unit 116 is operably coupled to a timing control unit 118 to maintain synchronisation of data processing.

The timing control unit 118 has a synchronisation output 120 operably coupled to a timing input 122 of the DFT unit 116. A control output 124 of the timing control unit 118 is operably coupled to the control input 114 of the phase signal generator 112.

In this example, the DFT unit 116 has a plurality of digital in-phase (I)/quadrature (Q) outputs 126. In this example, the DFT unit 116 comprises b pairs of digital I/O outputs corresponding to different harmonics of measured signals. As the output of the integrator 110 is an accumulated charge and, in this example in the analogue domain, the output of the integrator 110 needs to be converted to the digital domain. This can be achieved, for example, by employing a photon counter as the integrator 110 or providing an analogue-to-digital converter before the DFT unit 116.

A first pair of I/O outputs of the plurality of digital I/O outputs 126, relating to the first harmonic of received reflected optical signals, is coupled to a phase angle calculation unit, for example an arctan unit 128. A first output of the arctan unit 128 is coupled to an input 130 of an angular error analysis unit 132 having, in this example, a data modelling functionality. The angular error analysis unit 132 is provided to calculate phase error values and, in this example, generate a lookup table held in a data store. Consequently, the angular error analysis unit 132 is operably coupled to a data store supported by, for example, a digital memory. The data store stores a lookup table 134. A second output of the arctan unit 128 is operably coupled to an input 136 of an angle correction unit 138, a port 140 of the angle correction unit 138 is capable of accessing the lookup table 134. An output of the angle correction unit 138 is coupled to further downstream processing units that perform various other functions, for example range calculation using corrected measured angles. However, as the structure and operation of the downstream hardware is not core to an understanding of the embodiments set forth herein, for the sake of clarity and conciseness of description, the downstream hardware will not be descried further herein. In this example, the DFT unit 116, the arctan unit 128, the angular error analysis unit 132, the data store, and/or the angle correction unit 138 constitute a signal processing circuit.

Figure 3:
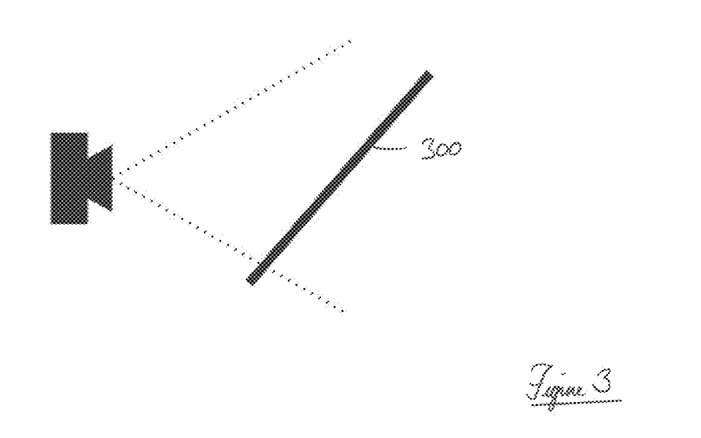
FIGS. 3 and 4 are schematic diagrams of one or more objects in a scene as used by the apparatus of FIG. 1 and the method of FIG. 2.
Figure 4:
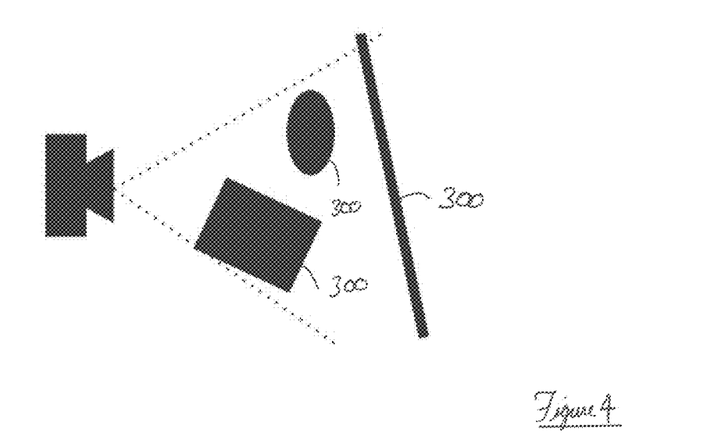

In operation (FIG. 2), the source of electromagnetic radiation 102 emits a continuous wave optical signal that illuminates (Step 200) a scene. In order to enable the examples described herein to operate, it is necessary to introduce a phase delay into the light emitted by the source of electromagnetic radiation 102 and/or apply the phase delay to the light somewhere between (and including) emission and reception. In this example, an object is placed in the scene to serve as a time-of-flight modifier, the object reflecting the emitted optical signal. In this regard, and referring to FIG. 3, the object 300 can be deliberately placed relative to the source of electromagnetic radiation 102 so as to present a surface to the source of electromagnetic radiation 102 that extends away from the array of photonic mixer pixel devices 104, thereby providing a plurality of reflection distanced to the apparatus 100. In such an example, the object 300 (FIG. 3) can be a simple slanted object providing a plurality of distances to the array of photonic mixer pixel devices 104 spanning a sufficient distance range to cover one circular error period. In the case of a normal operating mode employing four phase offset values, the circular error period is $\pi/2$. In another example, the object 300 (FIG. 4) can be any one or more objects randomly positioned in the scene, but providing a sufficient number of different distances to the array of photonic mixer pixel devices 104 to span a range of distances that correspond to at least the circular error period. However, it should be appreciated that the distances to any parts of the object are not known to or stored by the apparatus 100. In these examples, the object 300 constitutes a time-of-flight modification unit.

Figure 2:
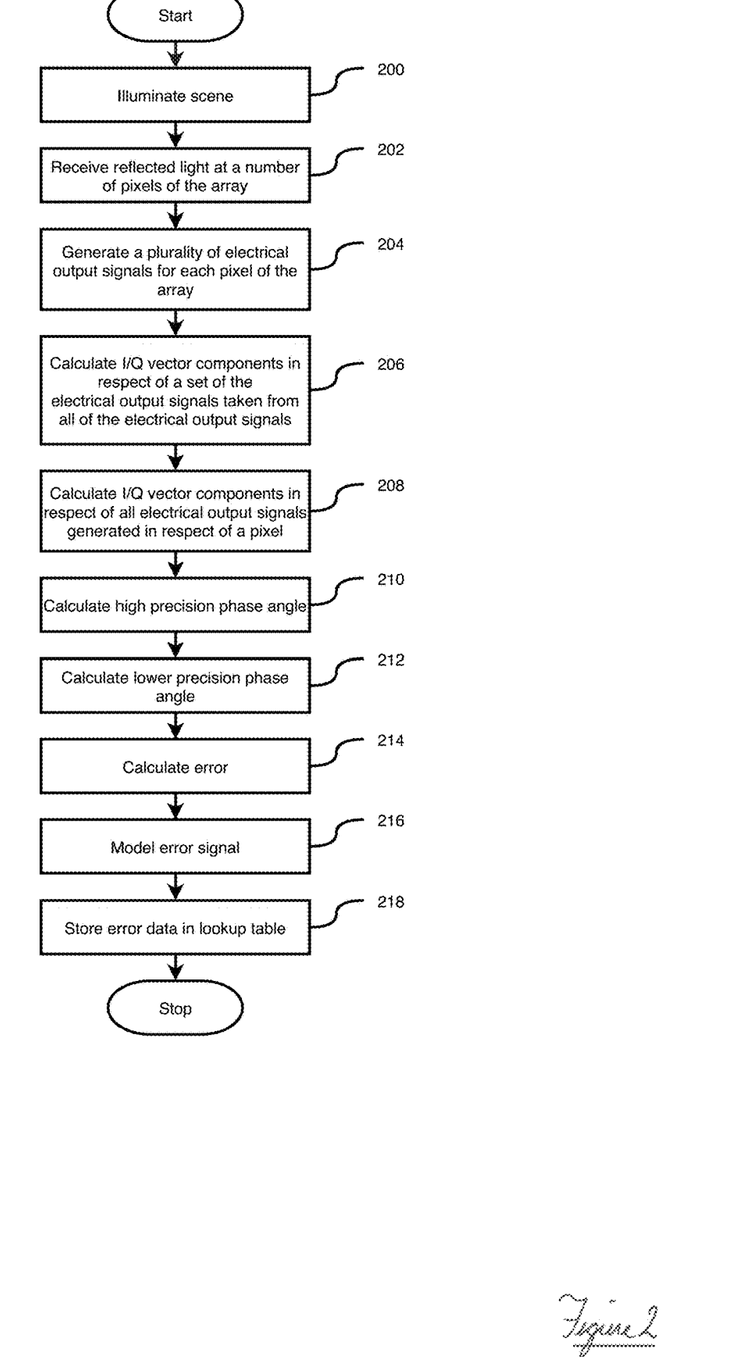
FIG. 2 is a flow diagram of a method of calculating a phase angle correction value performed by the apparatus of FIG. 1 and constituting another embodiment of the invention.

The optical signal reflected by the object is received (Step 202) by each photonic mixer pixel device 104 of the array of photonic mixer devices of the apparatus 100. The phase signal generator 112 generates a continuous wave electrical signal, the timing control unit 118 controlling cycling through the set of phase offsets in respect of the electrical signal relative to the continuous wave optical signal. In this example, for calibration purposes, the phase signal generator 112 cycles through a plurality of phase offset values corresponding to a high precision measurement, for example that results in measurements with a very low level of circular errors, for example eight phase offset values. However, a different number of phase offset values can be employed, for example a greater number of phase offset values. A synchronisation signal is also applied by the synchronisation output 120 to the DFT unit 116.

For the sake of brevity, calculation of a phase error value will now be described with respect to a single pixel of the array of pixels, but the skilled person should appreciate that the functionality described is also performed by other pixels in the array of pixels. Thus, in order to calculate a phase angle error, a reference phase angle is calculated by applying the electrical signal generated by the phase signal generator 112 to the photonic mixer 108. The phase offset of the electrical signal is cycled through the set of phase offset values mentioned above and digital representations of the charges generated and stored (Step 204) in the integrator 110, constituting measurements, in respect of each phase offset value of the set of phase offset values are received by the DFT unit 116 in series and converted (Step 206) to a reference pair of I/O outputs using all the electrical output signals generated by the photonic mixer 108 in respect of all the phase offset values applied by the phase signal generator 112. In this regard, the plurality of electrical output signals generated during a measurement cycle or frame cycle constitutes measurement at a first level of precision. The reference pair of I/O outputs constitute an I/O reference vector, $V_R$, representing the complex valued analogue electrical measurements in respect of the fundamental frequency.

It should be appreciated that, the integrator 110 provides a plurality of phase-separated amplitude measurement outputs in series representing respective accumulated charge levels for applied phase offset values in respect of the photonic mixer pixel device 102. As such, the DFT unit 116 calculates, for each measurement cycle, intermediate I and Q values for phase-separated amplitude measurements respectively received in series, which are accumulated in respect of the measurement cycle to generate final I and Q value results. In this example, operation of such an arrangement comprises vectors being calculated iteratively using the DFT unit 116 in respect of each incoming phase angle measurement. Consequently, as part of the process for calculating (Step 206) the reference pair of I/O outputs, the DFT unit 116 generates (Step 208) an interim result constituting a measurement pair of I/O outputs in respect of a subset of the plurality of electrical output values and corresponding to a subset of the phase offset values applied by the phase signal generator 112. The subset of electrical output signals used constitutes measurement at a second level of precision. The measurement pair of I/O outputs constitute an I/O measurement vector, $V_M$, representing the complex valued analogue electrical measurements in respect of the fundamental frequency. The DFT unit 116 can also generate other I/O vectors in respect of harmonics of the charges measured by the integrator 108.

It should also be appreciated that where a sufficiently large number of phase offset values are applied in respect of measurement at the first level of precision, the plurality of electrical output signals can comprise multiple sets of electrical output signals corresponding to measurements at the second level of precision. For example, where 8 phase offset values are employed to measure at the first level of precision, the plurality of electrical output signals (eight) comprises a first set of electrical output signals (four) and a second set of electrical output signals (four) both corresponding to measurement at the second level of precision. It therefore follows that the plurality of phase offset values employed to generate the plurality of electrical output signals can be notionally divided into multiple sets of predetermined phase offset values, for example a first set of phase offset values and a second set of phase offset values, respectively corresponding to the first set of electrical output signals and the second set of electrical output signals. In such an example, the different sets of predetermined phase offset values comprise different phase offset values, i.e. in terms of set theory, an intersection of the multiple sets yields an empty set. As such, the first set of predetermined phase offset values is different from the second set of predetermined phase offset values. However, in other examples, the first set of predetermined phase offset values can comprise a number of phase offset values in common with the second set of predetermined phase offset values, i.e. the intersection is not an empty set. In some examples, the first set of predetermined phase offset values can be the same as the second set of predetermined phase offset values.

After the electrical measurement signals are converted to the frequency domain, the I- and Q-values for the fundamental frequency in respect of the reference pair of I/O outputs and the measurement pair of I/O outputs are provided by the DFT unit 116 at the output thereof. In this example, the synchronisation signal ensures that the fundamental frequency I/O outputs of a current measurement frame of the DFT unit 116 are synchronously received by the arctan unit 128. The arctan unit 128 then, in accordance with the indirect time of flight measurement technique, calculates (Step 210) an angle of the reference vector, $V_R$, constituting a reference phase angle, $\varphi_{ref}$, in the complex plane from the fundamental frequency reference I and Q values. Similarly, and also in accordance with the indirect time of flight measurement technique, the arctan unit 128 calculates (Step 212) an angle of the measurement vector, $V_M$, constituting a measurement phase angle, $\varphi_{meas}$, in the complex plane from the fundamental frequency measurement I and Q values. The reference phase angle, $\varphi_{ref}$, corresponds to the measurement at the first level of precision and the measurement phase angle, $\varphi_{meas}$, corresponds to the measurement at the second level of precision, the first level of precision being greater than the second level of precision. The angular error analysis unit 132 receives the calculated reference phase angle, $\varphi_{ref}$, and the calculated measurement phase angle, $\varphi_{meas}$, and calculates (Step 214) an error or correction value, for example a difference between the calculated reference phase angle, $\varphi_{ref}$, and the calculated measurement phase angle, $\varphi_{meas}$. The above process is performed in relation to each of the photonic mixer pixel devices 104 of the array and the angular error analysis unit 132 receives the calculated reference phase angles, $\varphi_{ref}$, and the calculated measurement phase angles, $\varphi_{meas}$, in respect of the all of the photonic mixer pixel devices 104 of the array of photonic mixer devices (unless data in respect of one or more of the pixels of the array are disregarded) and calculates (Step 214) a plurality of correction/error values. In this regard, the object 300, in this example, effectively applies different phase delays to the light emitted by the source of electromagnetic radiation 102 and so each photonic mixer pixel device of the array is capable of providing data to calculate a pair of a phase angles (reference, $\varphi_{ref}$, and measurement, $\varphi_{meas}$) in respect of different phase delays. Thus, the object or objects 300 extend away from the array of photonic mixer pixel devices 104 sufficiently to enable a range of phase angle error values to be calculated in respect of and within the circular error period.

Once the angular error analysis unit 132 has a sufficient number of calculated error values (within the circular error period), the angular error analysis unit 132 analyses the plurality of calculated phase errors and models (Step 216) the distribution of the plurality of error values with the respective calculated measurement phase angles, $\varphi_{meas}$.

Typically, the distribution can be fitted to a sinusoid or more than one sinusoid. The modelling can be, for example, by way of any suitable sinusoidal fitting algorithm.

Figure 5:
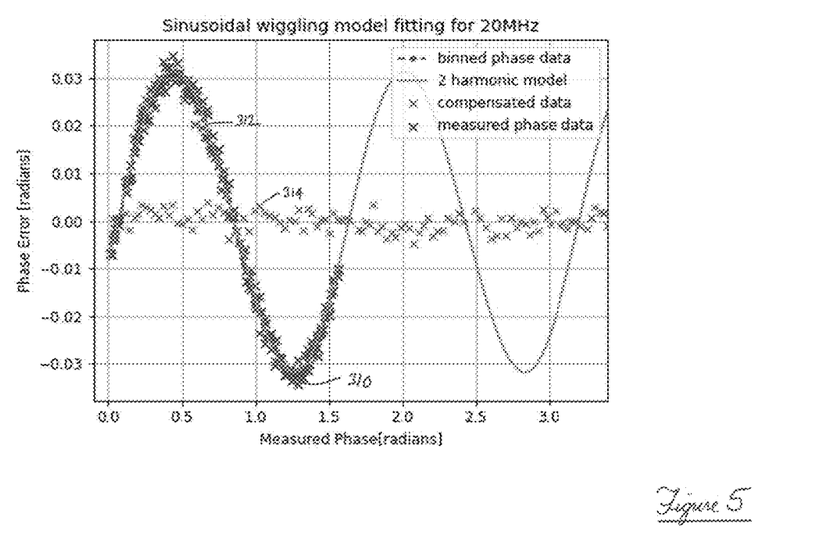
FIG. 5 is a graph plotting modelling of compensation data and use of the compensation data to correct phase angle values using the apparatus of FIG. 1 and the method of FIG. 2.

Turning to FIG. 5, when plotted, the error values 310 referenced against calculated measurement phase angles, $\varphi_{meas}$, have a sinusoidal shape. A modelled sinusoidal signal 312 follows the plot of error values. Indeed, when the modelled sinusoidal signal 312 is used to subtract an expected error value, obtained directly from the model, from a corresponding plotted phase angle error value, $\phi_{err}$, 310 the resulting compensated error data 314 is greatly reduced as compared with the corresponding plotted error value. In some examples, prior to modelling, the error values can be subjected to a binning process.

It can be seen that when plotting the calculated phase angle error values, $\phi_{err}$, against the measured phase angle, $\varphi_{meas}$, calculated using the measurement vector, $V_M$, in respect of the second level of precision, the plot is cyclic. In this regard, as the circular error is periodic, over a period of $2\pi$ in this example, the number of calculated values stored in the lookup table 134 can optionally be reduced by a factor of four for a four phase offset value measurement, i.e. $\pi/2$. This is the cyclic error period.

Referring back to FIG. 2, thereafter, in this example, the angular error analysis unit 132 selects a plurality of equally spaced points, constituting a predetermined phase angle interval, corresponding to calculated measurement phase angles, $\varphi_{meas}$, constituting uncorrected measurement phase angles, and their corresponding modelled expected phase error values and stores (Step 218) them in the lookup table 134 for subsequent use when the apparatus 100 is not performing a calibration procedure. In this example, the lookup table 134 comprises 64 equally spaced measurement phase angles, $\varphi_{meas}$, between 0 and $\pi/2$ and corresponding to modelled expected phase error values. In other examples, the model can be accessed directly via the angular error analysis unit 132 instead of using the lookup table 134 and instead used upon receipt of a specific calculated measurement phase angles, $\varphi_{meas}$. In such an example, the angle correction unit 138 is operably coupled to the angular error analysis unit 132 as the lookup table 134 is unnecessary.

During non-calibration operation (FIG. 6), the lookup table 134 is used as follows. In this regard, the operation will be described with respect to a single photonic mixer pixel device 104, but the skilled person should appreciate that the described operation applies equally to the other pixels of the array.

Figure 6:
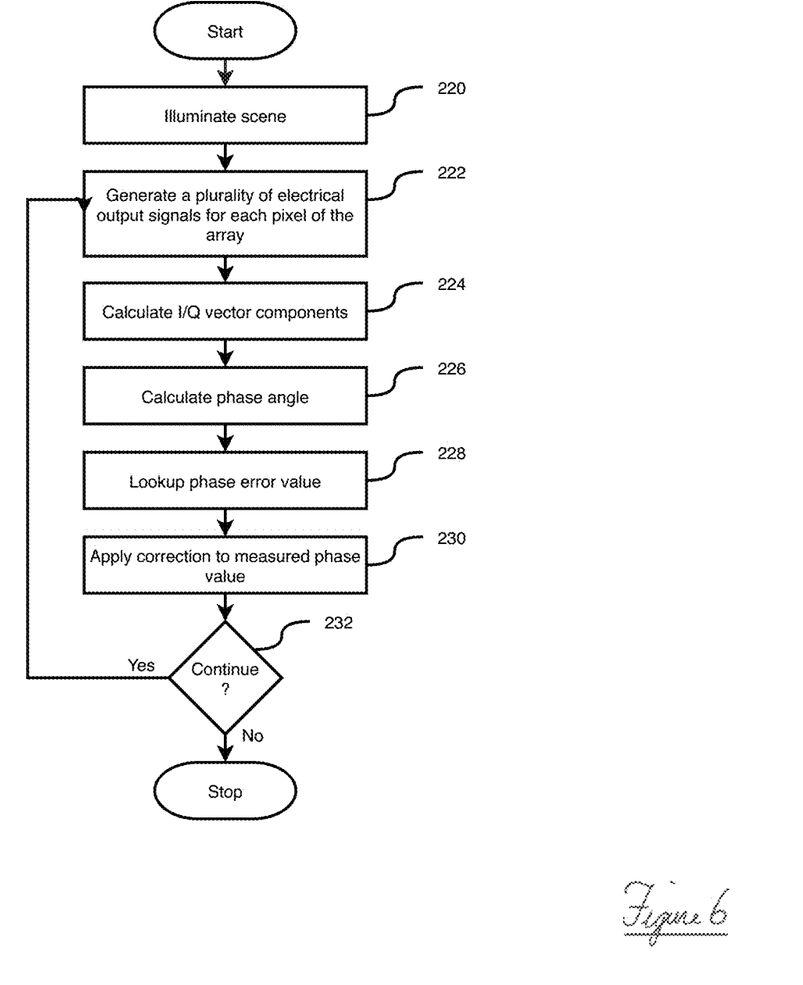
FIG. 6 is a flow diagram of a method of correcting a calculated phase angle obtained using the method of claim 2.

The source of electromagnetic radiation 102 again emits a continuous wave optical signal that illuminates (Step 220) a scene. An object in the scene, for example, reflects the emitted optical signal. The phase signal generator 112 generates a continuous wave electrical signal, the timing control unit 118 controlling cycling through the set of phase offsets in respect of the electrical signal relative to the continuous wave optical signal. In this example, the second, lower level precision is used and so four phase offset values are generated by the phase signal generator. The synchronisation signal is also applied by the synchronisation output 120 to the DFT unit 116.

In order to calculate a corrected phase angle, a phase angle is calculated by applying the electrical signal generated by the phase signal generator 112 to the photonic mixer 108 and the phase offset of the electrical signal is cycled through the set of phase offsets mentioned above and digital representations of the charges generated and stored (Step 222) in the integrator 110, constituting measurements, in respect of each phase offset value of the set of phase offset values are received by the DFT unit 116 in series and converted to a pair of I/Q outputs constituting an I/Q vector (Step 224), V, representing the complex valued analogue electrical measurements in respect of the fundamental frequency.

As in the previous example relating to the generation of the lookup table, the DFT unit 116 can also generate other I/Q vectors in respect of harmonics of the charges measured by the integrator 110. After the electrical measurement signals are converted to the frequency domain, the I- and Q-values for the fundamental frequency are provided by the DFT unit 116 at the outputs thereof. In this example, the synchronisation signal ensures that the fundamental frequency I/Q outputs of a current measurement frame of the DFT unit 116 are synchronously received by the arctan unit 128. The arctan unit 128 then, in accordance with the indirect time of flight measurement technique, calculates (Step 226) an angle of the vector, V, constituting an extracted (measured) calculated phase angle, $\varphi_{meas}$, in the complex plane from the fundamental frequency I and Q values.

The extracted phase angle, $\varphi_{meas}$, is then passed to the angle correction unit 138, which then access the lookup table stored by the lookup table 134. In response to receipt of the extracted phase angle, $\varphi_{meas}$, the angle correction unit 138 accesses (Step 228) the lookup table 134 and obtains a phase angle correction value, $-\varphi_{err}$, corresponding to the value of the extracted phase angle, $\varphi_{meas}$, received, which is applied (Step 230) by the angle correction unit 138, for example added, to the extracted phase angle, $\varphi_{meas}$, obtained. The combination of the extracted phase angle, $\varphi_{meas}$, with the phase angle correction value, $-\varphi_{err}$, yields a corrected phase angle, $\varphi_{cor}$, which is provided at an output of the angle correction unit 138. The corrected phase angle, $\varphi_{cor}$, can then be used by the signal processing circuit to calculate a range to the source of the reflection of the emitted light.

The above steps (Steps 220 to 230) are repeated (Step 232) until correction of measured angles is no longer required.

In another example, the object or objects 300 need not be specifically set up for the purpose of calibration and one or more objects can be sought by a user from a naturally occurring scene. In this regard, the calibration is performed in the field immediately prior to, during or after use in respect of a measurement application for which the apparatus 100 is being used. As such, calibration can be performed "on the spot" or on site in real time. In order to collect a sufficient quantity of data to span a circular error period, a scene that changes can be selected. The degree of movement in the scene can vary from periodically and not very often to more frequently. Where changes in the scene are sufficiently rapid to risk corrupting the data collected during calibration, motion detection can be employed to disregard measurements made where movement has occurred within the measurement cycle. An example of such motion detection is described later herein.

Figure 7:
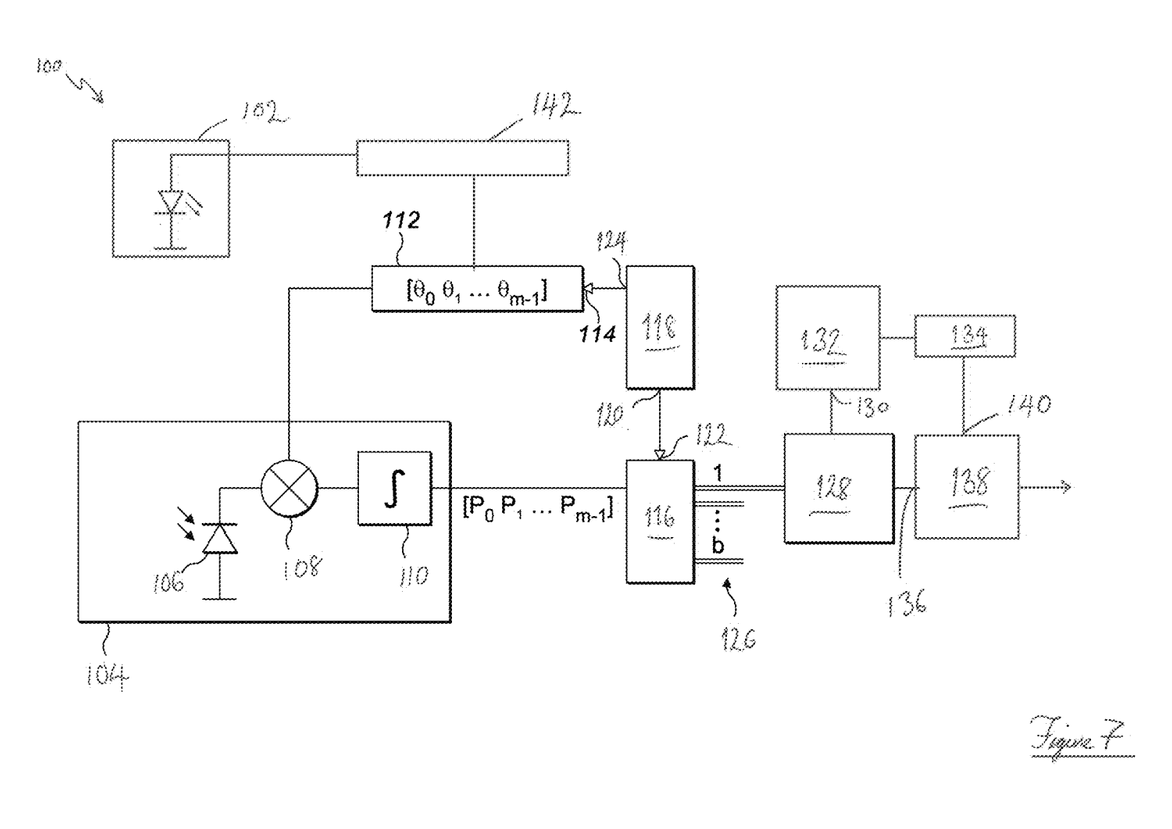
FIG. 7 is a schematic diagram of another phase angle error calculation apparatus constituting a further embodiment of the invention.

Referring to FIG. 7, in another embodiment, the phase delay is applied to the light emitted by the source of electromagnetic radiation 102 in a different manner to that described above in relation to the preceding examples. Instead of or in addition to using one or more objects that extend away from the source of electromagnetic radiation 102, a source of a plurality of phase delays is disposed between the source of electromagnetic radiation 102 and the phase signal generator 112. As such, the apparatus of FIG. 5 differs from the apparatus 100 of FIG. 1 in that the apparatus 100 comprises a delay network, for example a delay line, such as an analogue delay line 142. In this example, the delay line is a low accuracy delay line. In this regard, a given delay generated by the delay line possesses an inherent margin of error and so can vary by up to a fraction of a phase error period, for example up to about a half or up to about a quarter of the period. In other examples, the margin of error can vary by more than about a half of the phase error period. In this example, the source of the plurality of phase delays is configured to generate the plurality of phase delays so that the phase delays are random. The plurality of phase delays therefore comprises different phase delays, each of which is unknown to the apparatus 100 and not stored thereby.

Figure 8:
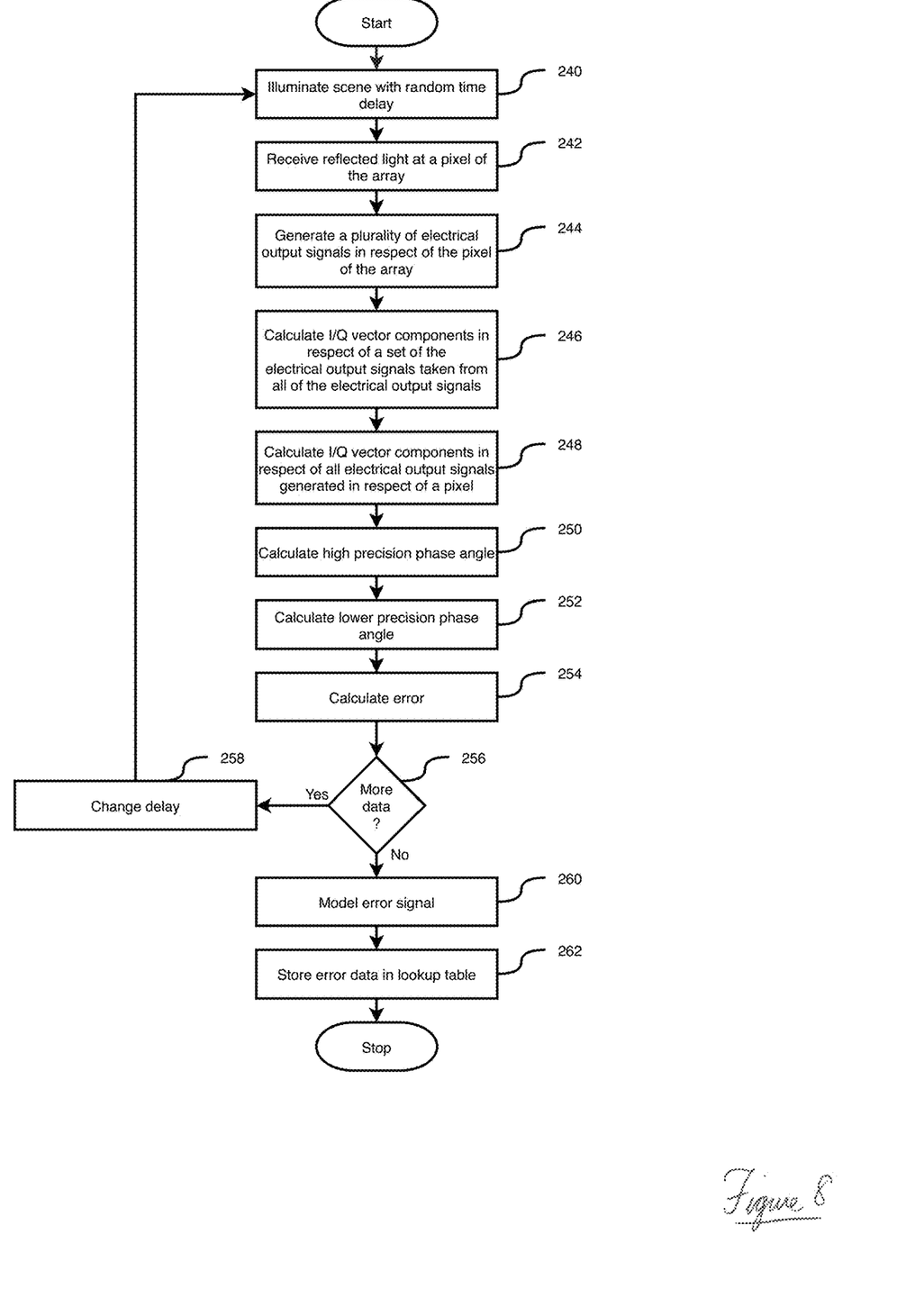
FIG. 8 is a flow diagram of another method of calculating a phase angle correction value performed by the apparatus of FIG. 7 and constituting yet another embodiment of the invention.
Figure 9:
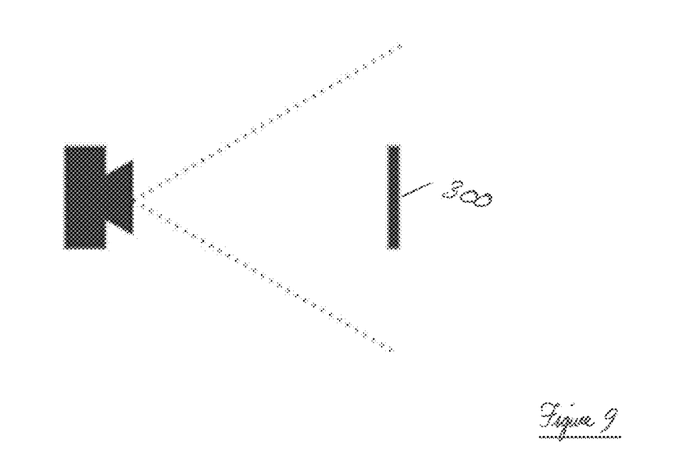
FIG. 9 is schematic diagrams of an object in a scene as used by the apparatus of FIG. 7 and the method of FIG. 8.

In operation (FIG. 8), the source of electromagnetic radiation 102 emits a continuous wave optical signal that illuminates (Step 240) a scene. However, the analogue delay line 142 introduces a phase delay to the optical signal illuminating the scene. Referring to FIG. 9, another object 300 can be placed opposite the source of electromagnetic radiation 102, for example facing directly opposite the source of electromagnetic radiation 102 so that the source of electromagnetic radiation 102 is not presented with a surface that extends away therefrom, but instead is presented with a surface that is substantially static and provides a substantially constant or single distance to the photodiode 106 of the photonic mixer pixel device 104.

In this example, the analogue delay line 142 is configured to provide a plurality of phase delays to the source of electromagnetic radiation 102 so as to span one circular error period, one per measurement cycle. In the case of a normal operating mode employing four phase offset values, the circular error period is π/2. Consequently, the application of the plurality of phase delays enables a range of phase measurements to be made, the range of phase measurements comprising a plurality of phase errors, respectively. However, in this example, the range of phase measurements is within the circular error period.

The optical signal reflected by the object 300 is received (Step 242) by the photonic mixer pixel device 104. The phase signal generator 112 generates a continuous wave electrical signal, the timing control unit 118 controlling cycling through the set of phase offsets in respect of the electrical signal relative to the continuous wave optical signal. In this example, for calibration purposes, the phase signal generator 112 again cycles through the plurality of phase offset values corresponding to a high precision measurement, for example that results in measurements with a very low level of circular errors, such as eight phase offset values. A synchronisation signal is also applied by the synchronisation output 120 to the DFT unit 116.

In order to calculate a phase angle error, the reference phase angle, $\varphi_{ref}$, is calculated by applying the electrical signal generated by the phase signal generator 112 to the photonic mixer 108 and the phase offset of the electrical signal is cycled through the set of phase offsets mentioned above and digital representations of the charges generated and stored (Step 244) in the integrator 110, constituting measurements, in respect of each phase offset value of the set of phase offset values are received by the DFT unit 116 in series and converted (Step 248) to a reference pair of I/O outputs using all the electrical output signals generated by the photonic mixer 108 in respect of all the phase offset values applied by the phase signal generator 112. The reference pair of I/O outputs constitute an I/O reference vector, $V_R$, representing the complex valued analogue electrical measurements in respect of the fundamental frequency.

It should be appreciated that the integrator 110 provides a plurality of phase-separated amplitude measurement outputs in series representing respective accumulated charge levels for applied phase offset values in respect of the photonic mixer pixel device 102. As such, the DFT unit 116 calculates, for each frame cycle or measurement cycle, intermediate I and Q values for phase-separated amplitude measurements respectively received in series, which are accumulated over a frame cycle to generate final I and Q value results. Operation of such an arrangement comprises vectors being calculated iteratively using the DFT unit 116 in respect of each incoming phase angle measurement. Consequently, as part of the process for calculating the reference pair of I/O outputs, the DFT unit 116 generates (Step 246) an interim result constituting a measurement pair of I/O outputs in respect of a subset of the phase offset values applied by the phase signal generator 112. The measurement pair of I/O outputs constitute an I/O measurement vector, $V_M$, representing the complex valued analogue electrical measurements in respect of the fundamental frequency. As in previous examples, the DFT unit 116 can also generate other I/O vectors in respect of harmonics of the charges measured by the integrator 108.

After the electrical measurement signals are converted to the frequency domain, the I- and Q-values for the fundamental frequency in respect of the reference pair of I/O outputs and the measurement pair of I/O outputs are provided by the DFT unit 116 at the outputs thereof. In this example, the synchronisation signal ensures that the fundamental frequency I/O outputs of a current measurement frame of the DFT unit 116 are synchronously received by the arctan unit 128. The arctan unit 128 then, in accordance with the indirect time of flight measurement technique, calculates (Step 250) an angle of the reference vector, $V_R$, constituting a reference phase angle, $\varphi_{ref}$, in the complex plane from the fundamental frequency reference I and Q values. Similarly, and in accordance with the indirect time of flight measurement technique, the arctan unit 128 calculates (Step 252) an angle of the measurement vector, $V_M$, constituting a measurement phase angle, $\varphi_{meas}$, in the complex plane from the fundamental frequency measurement I and Q values. The reference phase angle, $\varphi_{ref}$, constitutes a measurement at the first level of precision and the measurement phase angle, $\varphi_{meas}$, constitutes a measurement at the second level of precision, the first level of precision being greater than the second level of precision. The angular error analysis unit 132 receives the calculated reference phase angle, $\varphi_{ref}$, and the calculated measurement phase angle, $\varphi_{meas}$, and calculates (Step 254) an error value, for example a difference between the calculated reference phase angle, $\varphi_{ref}$, and the calculated measurement phase angle, $\varphi_{meas}$.

As the process of applying a phase delay to the source of electromagnetic radiation 102 and subsequent calculation of the error value is in respect of a single pixel, the process has to be repeated until the angular error analysis unit 132 has collected a sufficient amount of data, for example spanning the cyclic error period. The signal processing circuit therefore determines (Step 256) whether the angular error analysis unit 132 has calculated a sufficient quantity of data to be able to analyse the plurality of calculated phase errors and model the data calculated. In the event that the angular error analysis unit 132 requires further error value data points, the phase delay generated by the analogue delay line 142 being random is changed automatically, and the above process is repeated (Steps 240 to 254) over successive measurement cycles, i.e. a plurality of measurement cycles, until a sufficient quantity of error correction values within the cyclic error period have been generated. In this regard, it should be appreciated that differing quantities of phase delay are applied to the light emitted by the source of electromagnetic radiation 102 between successive measurement cycles.

Thereafter, the angular error analysis unit 132 models (Step 260) the distribution of the plurality of error values with the respect to the calculated measurement phase angles, $\varphi_{meas}$. As in relation to the example described with reference to FIGS. 1 to 4, the distribution can be fitted to a sinusoid or more than one sinusoid. The modelling can be, for example, by way of any suitable sinusoidal fitting algorithm. In this regard, the plots of FIG. 5 are representative of the data collected in relation to the present embodiment. In some examples, prior to modelling, the error values can be subjected to a binning process.

Referring back to FIG. 8, in this example, the angular error analysis unit 132 selects a plurality of equally spaced points corresponding to calculated measurement phase angles, $\varphi_{meas}$, and their corresponding modelled error values and stores (Step 262) them in the lookup table 134 in respect of a predetermined range of measured phase angles calculated at the second level of precision, for example within the circular error period, for subsequent use when the apparatus 100 is not performing a calibration procedure. In this example, the lookup table 134 comprises 64 equally spaced measurement phase angles, $\varphi_{meas}$, between 0 and $\pi/2$ and corresponding to modelled expected phase error values. In other examples, the model can be accessed directly via the angular error analysis unit 132 instead of using the lookup table 134 and instead used upon receipt of a specific calculated measurement phase angles, $\varphi_{meas}$. In such an example, the angle correction unit 138 is operably coupled to the angular error analysis unit 132 as the lookup table 134 is unnecessary.

As the process of using the data stored in the lookup table 134 to correct calculated measured phase angles measured at the second level of precision, it should be appreciated that the description of the method according to FIG. 6 applies in relation to the error correction data generated using the method described above in relation to FIG. 8.

Figure 10:
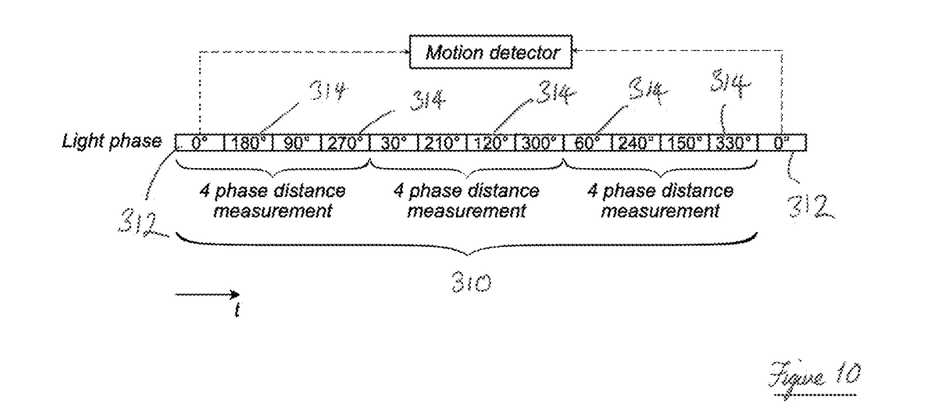
FIG. 10 is a schematic diagram of a measurement frame used to detect motion in respect of the apparatus of FIG. 1 or FIG. 7 or the method of FIG. 2 or FIG. 8.

In the above examples, it is desirable to detect motion with respect to the scene, because motion in the scene can frustrate attempts to measure phase angles accurately during calibration. Referring to FIG. 10, the signal processing circuit can comprise a motion detection unit so that motion can optionally be detected by comparing electrical output signals generated over successive frames, i.e. measurement cycles, where the electrical output signals relate to the application of the same phase offset value to the photonic mixer 108. For example, over a repeating measurement cycle 310 employing 12 phase offset values, a first electrical output signal is generated by the mixer pixel 108 in respect of a first phase offset value 312. In accordance with the indirect time of flight measurement technique, other phase offset values 314 are applied in turn to the photonic mixer 108 over the remainder of the duration of the measurement cycle 310 until the pattern of application of the phase offset values is repeated upon commencement of a subsequent measurement cycle. In this regard, upon commencement of the next measurement cycle, the first phase offset value 312 is again applied to the photonic mixer 108 and a second electrical output signal is generated. In this example, which can be applied to any of the examples already described above, the first electrical output value is compared with the second electrical output value using any suitable manner of comparison, for example subtraction and comparison with zero, in order to determine whether the first electrical output signal differs substantially from the second electrical output signal. In this regard, the degree of difference can be defined with reference to system noise, for example a number of standard deviations of the system noise. In the event that the first and second electrical output signals differ by more than a predetermined motion threshold value, the signal processing circuitry disregards the phase angle values calculated for calibration purposes they are deemed to be contaminated by motion in the scene. Consequently, the discarded calculated phase measurements do not result in the calculation of the corresponding phase error value and do not contribute to the dataset that it subsequently modelled in the above-described examples. In the event, that the motion threshold is not exceeded, the calculated phase angle values can be used in the dataset for modelling purposes. It should, however, be appreciated that the use of the above-described motion detection technique is purely exemplary and other motion detection techniques can be employed, for example as described in co-pending European patent application no. 20192948.6 the content of which is hereby incorporated herein by reference.

The skilled person should appreciate that the above-described implementations are merely examples of the various implementations that are conceivable within the scope of the appended claims. Indeed, it should be appreciated that other techniques to calculate the phase angles described above can be employed. For example, in relation to the second level of precision employing four phase offset values, instead of employing the arctan unit 128 described above, a triangular calculation unit employing a triangular calculation technique to calculate amplitude and/or phase can be employed. In this regard, the circular error of calculated phase angles can be corrected in real time using "triangular" phase measurements taken at the second level of precision using DFT based measurements taken at the first level of precision.

It should also be appreciated that although, in the above examples, an analogue delay line is employed, digital delay lines should not be considered precluded.

In the examples set forth above in relation to FIG. 1, i.e. the examples that do not employ the delay line, the plurality of phase offset values is applied by the phase signal generator 112 to the photonic mixer 108. However, the skilled person should appreciate that other implementations are possible within the context of the indirect time of flight methodology, for example instead of applying the plurality of phase offset value to the photonic mixer 108, the photonic mixer 108 can be provided with a continuous electrical signal and the plurality of phase offset value can be applied by the phase signal generator 112 to the source of electromagnetic radiation 102.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

What is claimed is:

1. A phase angle error calculation apparatus for an optical ranging system, the apparatus comprising:
    a light source configured to emit light in accordance with an indirect time of flight measurement technique;
    a photonic mixer cell configured to generate and store a plurality of electrical output signals respectively corresponding to a plurality of predetermined phase offset values applied in accordance with the indirect time of flight measurement technique over a measurement cycle; and a signal processing circuit configured to process the plurality of electrical output signals in accordance with the indirect time of flight measurement technique in order to calculate a reference vector and a reference phase angle from the reference vector, the plurality of electrical output signals corresponding to measurement at a first level of precision; wherein the signal processing circuit is configured to process a subset of electrical output signals from the plurality of electrical output signals in accordance with the indirect time of flight measurement technique in order to calculate a measurement vector and a measurement phase angle from the measurement vector, the subset of the electrical output signals corresponding to measurement at a second level of precision lower than the first level of precision; and the signal processing circuit is configured to calculate a phase angle correction value using the reference phase angle and the measurement phase angle.

2. The apparatus according to claim 1, further comprising:
a time-of-flight modification unit configured to introduce a phase delay into the light that is emitted and reflected back to the photonic mixer cell; wherein
the signal processing circuit is configured to perform a repeat calculation of the phase angle correction value over a plurality of measurement cycles subsequent to the measurement cycle in order to calculate a plurality of phase angle correction values.

3. The apparatus according to claim 2, wherein the phase delay is unknown.

4. The apparatus according to claim 2, wherein the time-of-flight modification unit is a delay network providing a plurality of different time delays and configured to delay the phase of the light emitted by the light source by differing amounts between the plurality of measurement cycles.

5. The apparatus according to claim 4, wherein the delay network comprises an analogue delay line.

6. The apparatus according to claim 4, wherein application of the plurality of different time delays of the delay network provides a range of phase measurements comprising respective phase errors, the range of phase measurements being at least within a circular error period.

7. The apparatus according to claim 4, wherein the time-of-flight modification unit is an object located in a scene and arranged relative to a plurality of photodetector elements so as to extend away from the plurality of photodetector elements sufficiently to enable a range of phase angle correction values to be calculated in respect of and at least within a circular error period.

8. The apparatus according to claim 1, further comprising:
a plurality of photonic mixer cells comprising the photonic mixer cell, the plurality of photonic mixer cells comprising a plurality of photodetector elements, respectively; and
a time-of-flight modification unit configured to introduce a plurality of respective phase delays into the light reflected back to the plurality of photodetector elements;
wherein the signal processing circuit is configured to perform the calculation of the phase angle correction value over the measurement cycle and in respect of the plurality of photonic mixer cells in order to calculate a plurality of phase angle correction values.

9. The apparatus according to claim 1, wherein the signal processing circuit is configured to support an error modelling unit configured to analyse a plurality of phase angle correction values and to generate a model of the plurality of phase angle correction values.

10. The apparatus according to claim 9, wherein the error modelling unit is configured to generate a lookup table comprising phase error correction values over a predetermined range of calculated phase angles in respect of measurements at the second level of precision.

11. The apparatus according to claim 10, wherein the phase error correction values correspond to a plurality of uncorrected measurement phase angles, a range of the plurality of uncorrected measurement phase angles comprising a circular error period.

12. The apparatus according to claim 1, wherein the plurality of electrical output signals in respect of the measurement at the first level of precision comprises a first set of electrical output signals in respect of the measurement at the second level of precision and a second set of electrical output signals in respect of the measurement at the second level of precision.

13. The apparatus according to claim 12, wherein the plurality of predetermined phase offset values comprises a first set of predetermined phase offset values and a second set of predetermined phase offset values; and
the first set of electrical output signals in respect of the measurement at the second level of precision corresponds to the first set of predetermined phase offset values and the second set of electrical output signals in respect of the measurement at the second level of precision corresponds to the second set of predetermined phase offset values.

14. The apparatus according to claim 13, wherein the second set of predetermined phase offset values are different to the first set of predetermined phase offset values.

15. The apparatus according to claim 13, wherein the first set of predetermined phase offset values comprises a number of phase offset values in common with the second set of predetermined phase offset values.

16. The apparatus according to claim 13, wherein the first set of predetermined phase offset values is the same as the second set of predetermined phase offset values.

17. The apparatus according to claim 1, wherein the signal processing circuit is configured to support a motion detection unit configured to detect motion during generation of the plurality of electrical output signals and to omit calculation of the phase angle correction value in response to detection of motion.

18. The apparatus according to claim 17, wherein the motion detection unit is configured to detect the motion by comparing a first electrical output signal in respect of a first predetermined phase offset value of the plurality of the predetermined phase offset values and a second electrical output signal in respect of a second subsequent predetermined phase offset value of the plurality of the predetermined phase offset values, the second subsequent predetermined phase offset value following application of a number of the plurality of predetermined phase offset values and the second phase offset value being substantially the same as the first phase offset value.

19. The optical ranging system comprising the phase angle error calculation apparatus according to claim 1, the system further comprising:

the signal processing circuit configured to apply the calculated phase angle correction value to the measurement phase angle in order to correct the measured phase angle; and the signal processing circuit is configured to calculate a range using the corrected measured phase angle.

20. A method of calculating a phase angle correction value, the method comprising:

a light source emitting light in accordance with an indirect time of flight measurement technique;

a photonic mixer cell generating and storing a plurality of electrical output signals respectively corresponding to a plurality of predetermined phase offset values applied in accordance with the indirect time of flight measurement technique over a measurement cycle; and a signal processing circuit processing the plurality of electrical output signals in accordance with the indirect time of flight measurement technique in order to calculate a reference vector and a reference phase angle from the reference vector, the plurality of electrical output signals corresponding to measurement at a first level of precision;

wherein the signal processing circuit processes a subset of electrical output signals from the plurality of electrical output signals in accordance with the indirect time of flight measurement technique in order to calculate a measurement vector and a measurement phase angle from the measurement vector, the subset of the electrical output signals being a smaller set than the plurality of electrical output signals and corresponding to measurement at a second level of precision lower than the first level of precision; and the signal processing circuit calculates the phase angle correction value using the reference phase angle and the measurement phase angle.

* * * * *